(12) United States Patent
Im

(10) Patent No.: US 10,718,252 B2
(45) Date of Patent: Jul. 21, 2020

(54) EXHAUST GAS DISPERSION DEVICE FOR AGRICULTURAL WORKING VEHICLE

(71) Applicant: LS MTRON LTD., Anyang-si, Gyeonggi-do (KR)

(72) Inventor: Chang Yong Im, Anyang-si (KR)

(73) Assignee: LS MTRON LTD., Anyang-si, Gyeonggi-Do (KR)

( * ) Notice: Subject to any disclaimer, the term of this patent is extended or adjusted under 35 U.S.C. 154(b) by 37 days.

(21) Appl. No.: 16/085,826

(22) PCT Filed: Mar. 3, 2017

(86) PCT No.: PCT/KR2017/002299
§ 371 (c)(1),
(2) Date: Sep. 17, 2018

(87) PCT Pub. No.: WO2017/160012
PCT Pub. Date: Sep. 21, 2017

(65) Prior Publication Data
US 2019/0178145 A1 Jun. 13, 2019

(30) Foreign Application Priority Data
Mar. 18, 2016 (KR) .......... 10-2016-0033053

(51) Int. Cl.
*F01N 13/08* (2010.01)
*F01N 13/20* (2010.01)
(Continued)

(52) U.S. Cl.
CPC .......... *F01N 13/082* (2013.01); *A01B 76/00* (2013.01); *F01N 13/20* (2013.01); *F16L 55/027* (2013.01)

(58) Field of Classification Search
CPC ........ F01N 13/082; F01N 13/20; A01B 76/00
(Continued)

(56) References Cited

U.S. PATENT DOCUMENTS 1,081,348 A * 12/1913 Unke et al. ............... F01N 1/08
181/264
1,922,848 A * 8/1933 Harley ...................... F01N 1/08
181/264
(Continued)

FOREIGN PATENT DOCUMENTS

JP 63012616 U1 1/1988
JP 4154011 3/1999
(Continued)

OTHER PUBLICATIONS

International Search Report for related International Application No. PCT/KR2017/002299; report dated Sep. 21, 2017; (3 Pages).
(Continued)

*Primary Examiner* — Patrick F Brinson
(74) *Attorney, Agent, or Firm* — K&L Gates LLP

(57) ABSTRACT

The present invention relates to an exhaust gas dispersion device for an agricultural working vehicle, comprising: a dispersing body into which an exhaust gas discharged from an exhaust port of the agricultural working vehicle flows; a deceleration part coupled to the distributing body to reduce the speed of the exhaust gas flowing into the dispersing body; and a plurality of dispersing holes formed through the dispersing body at positions spaced apart from each other so that the exhaust gas decelerated by the deceleration part is dispersed and discharged out of the dispersing body.

16 Claims, 16 Drawing Sheets

(51) Int. Cl.
*A01B 76/00* (2006.01)
*F16L 55/027* (2006.01)

(58) Field of Classification Search
USPC .................. 138/42, 37, 39; 181/264, 249
See application file for complete search history.

(56) References Cited

U.S. PATENT DOCUMENTS

| | | | | |
|---|---|---|---|---|
| 2,838,128 | A * | 6/1958 | Kliewer, Sr. | F01N 1/06 181/264 |
| 5,183,976 | A * | 2/1993 | Plemons, Jr. | F01N 1/06 181/264 |
| 5,444,197 | A * | 8/1995 | Flugger | F01N 1/06 181/264 |
| 5,925,857 | A * | 7/1999 | Birkel | F02B 27/04 181/250 |
| 6,283,246 | B1 * | 9/2001 | Nishikawa | F01N 1/06 181/255 |
| 6,364,054 | B1 * | 4/2002 | Bubulka | F01N 1/003 181/264 |
| 2002/0153197 | A1 * | 10/2002 | Cummings | F01N 1/02 181/249 |
| 2008/0053068 | A1 * | 3/2008 | Sangiovani | C12N 15/8227 60/282 |

FOREIGN PATENT DOCUMENTS

| | | |
|---|---|---|
| JP | 5027880 | 1/2010 |
| JP | 2010249095 | 11/2010 |
| JP | 2014240651 | 12/2014 |
| KR | 1020000056951 | 9/2000 |
| KR | 20140048273 A | 4/2014 |
| KR | 1020150072251 | 6/2015 |

OTHER PUBLICATIONS

Written Opinion for related International Application No. PCT/KR2017/002299; report dated Sep. 21, 2017; (9 pages).

* cited by examiner

[Figure 1] RELATED ART
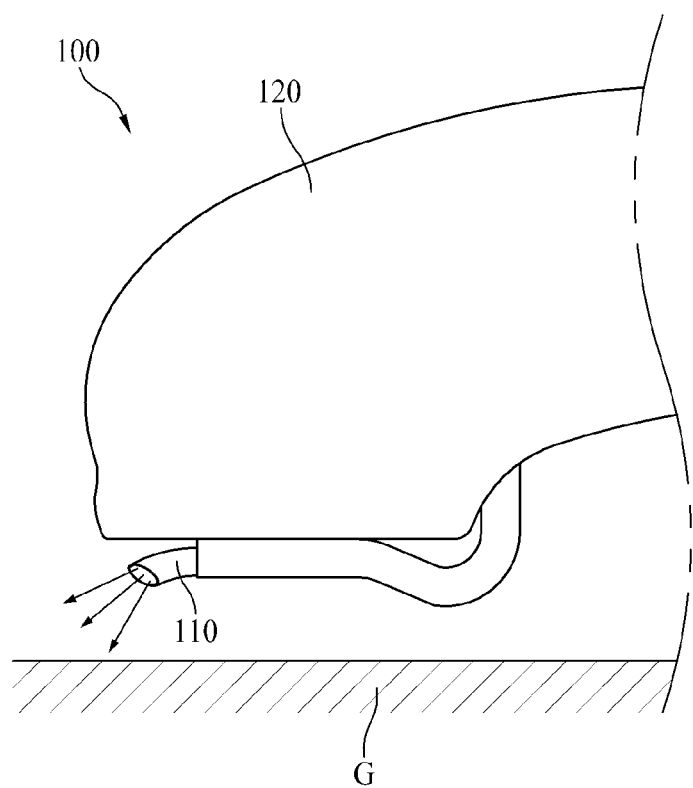

【Figure 2】
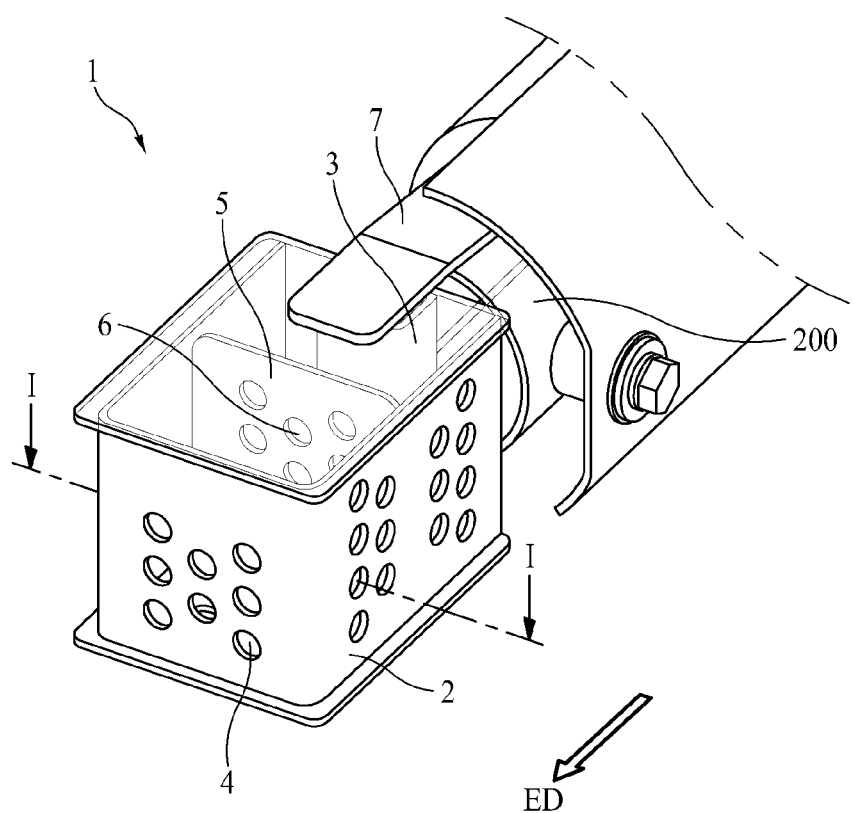

【Figure 3】
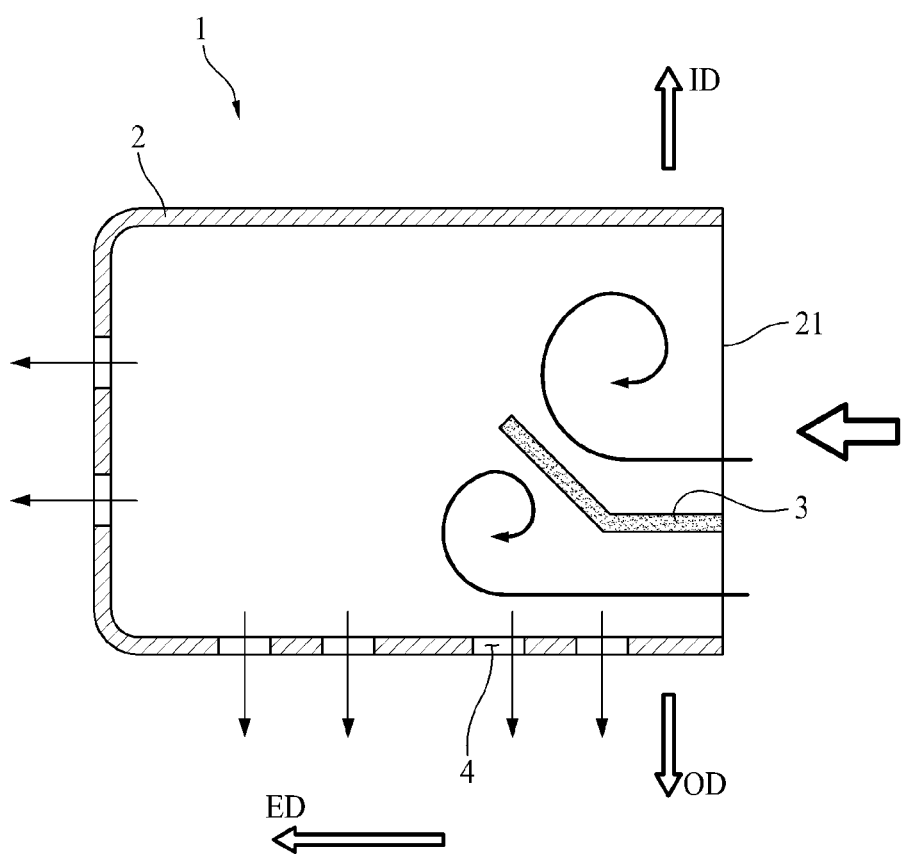

[Figure 4]
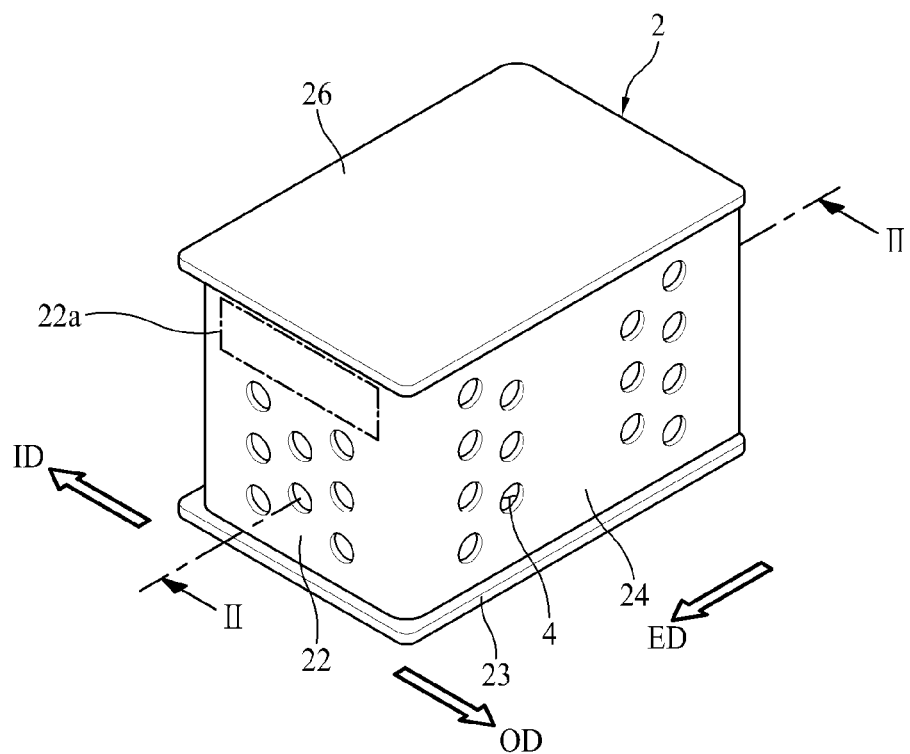

[Figure 5]
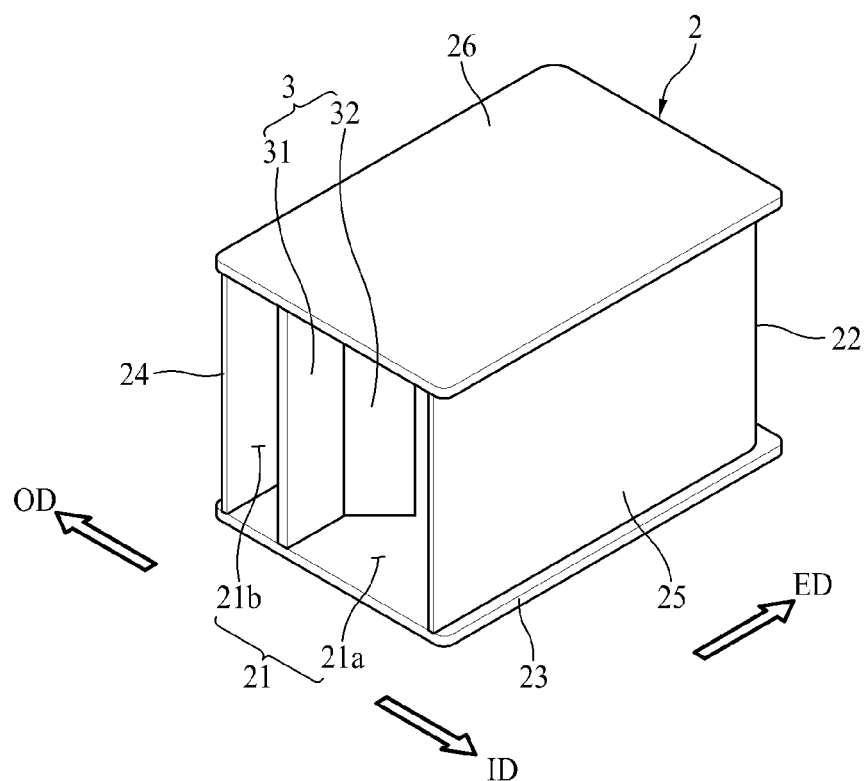

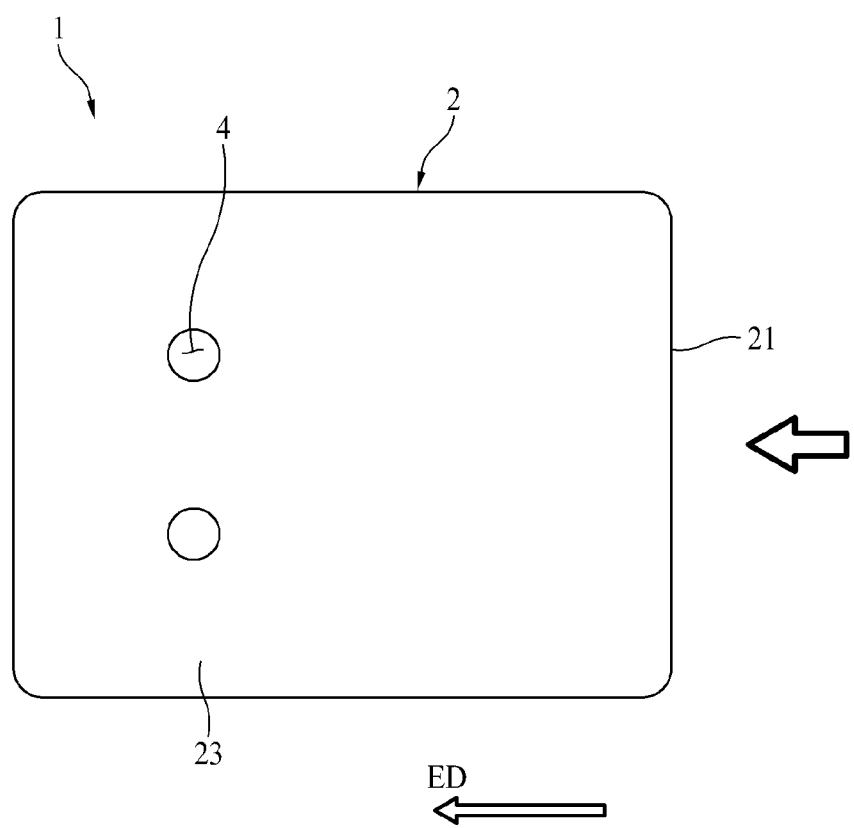
[Figure 6]

[Figure 7]
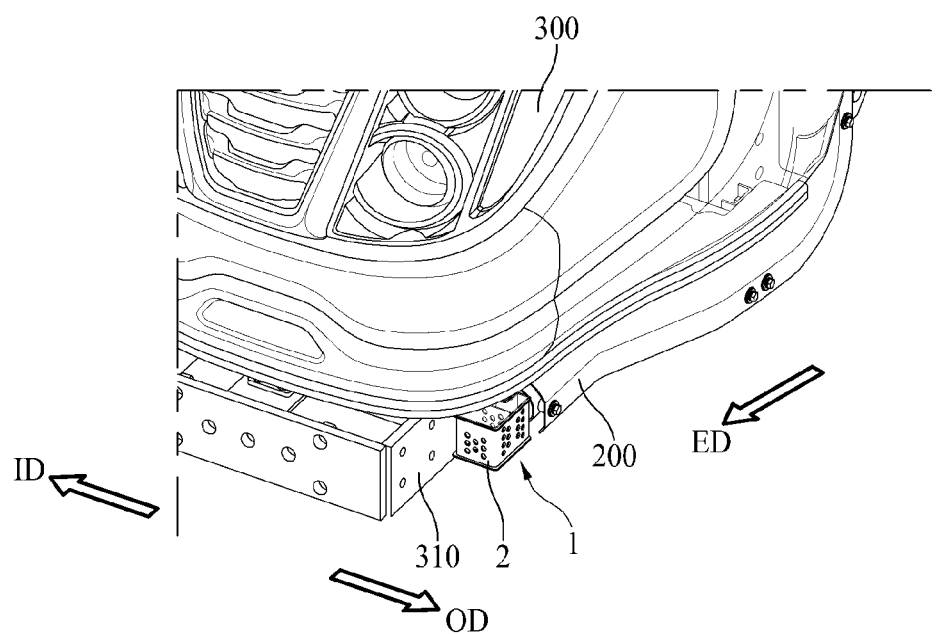

[Figure 8]
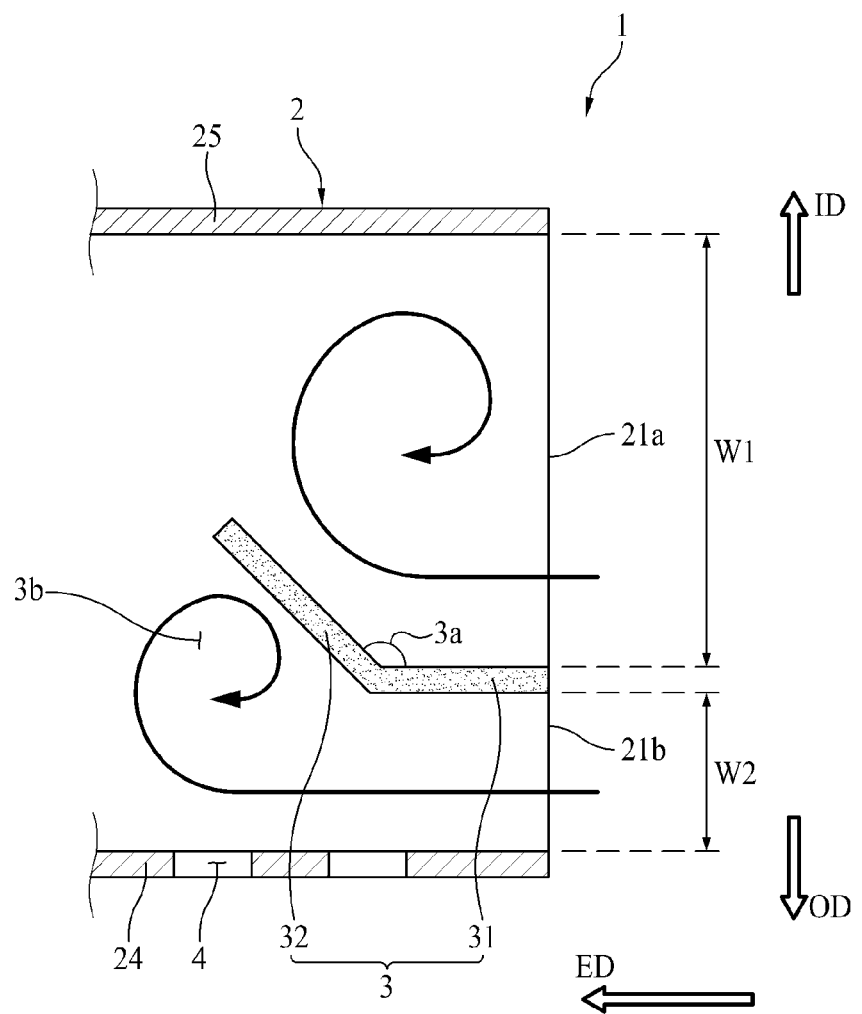

【Figure 9】
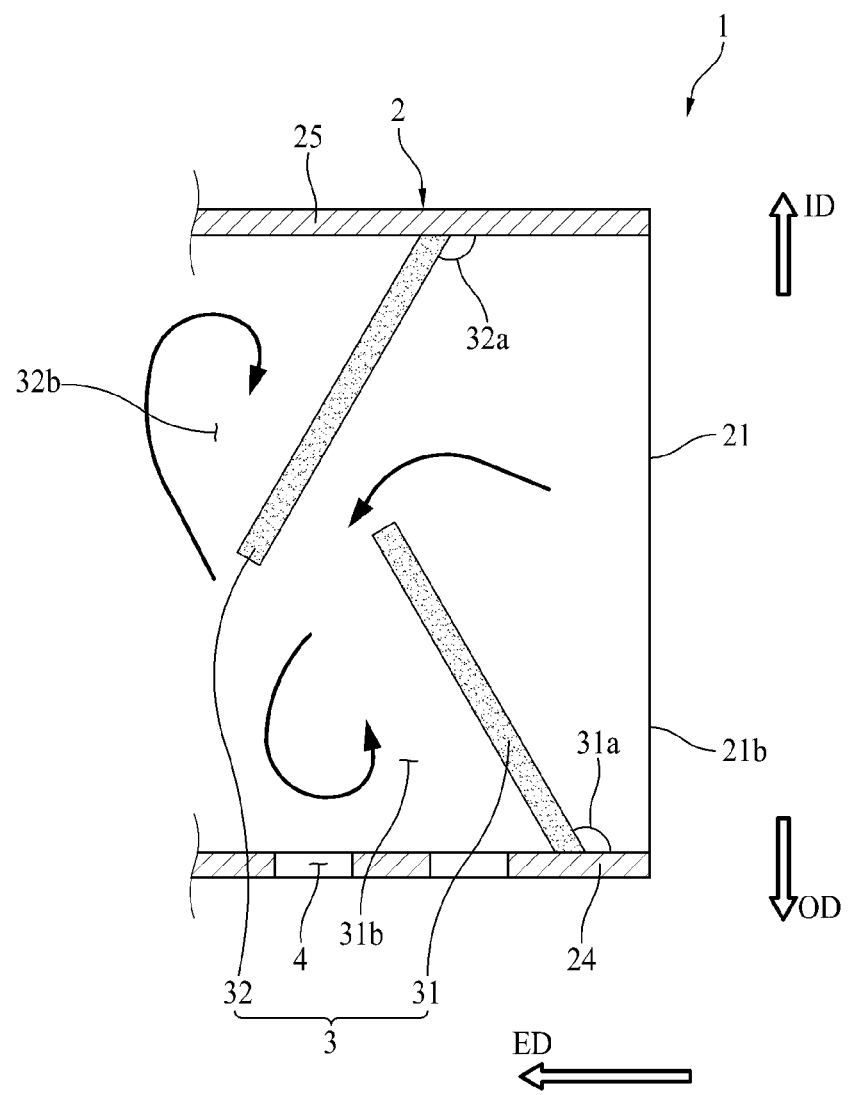

[Figure 10]
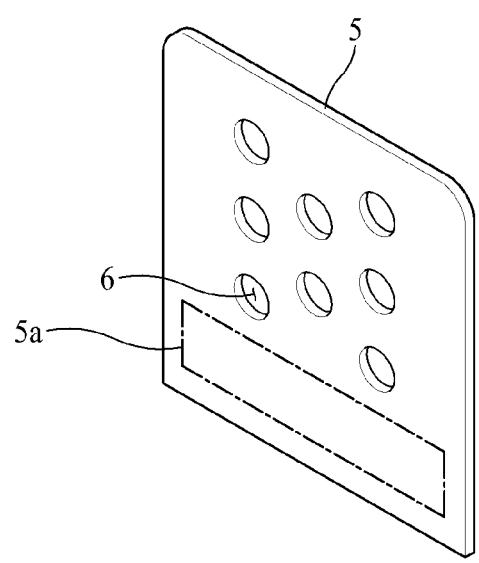

[Figure 11]
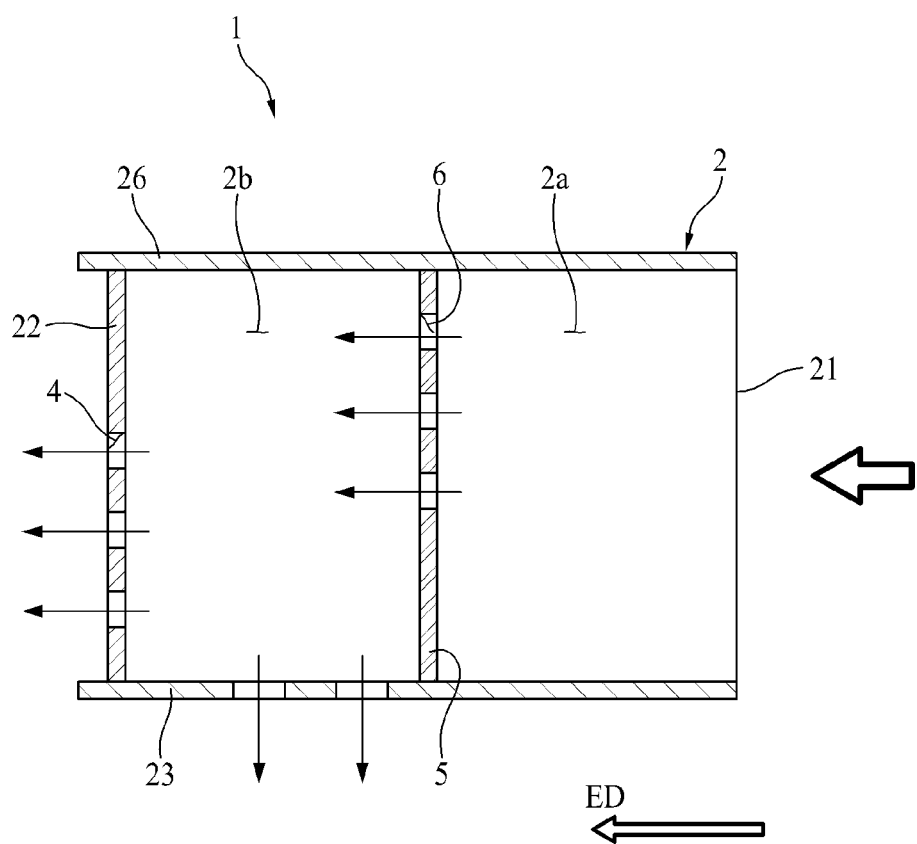

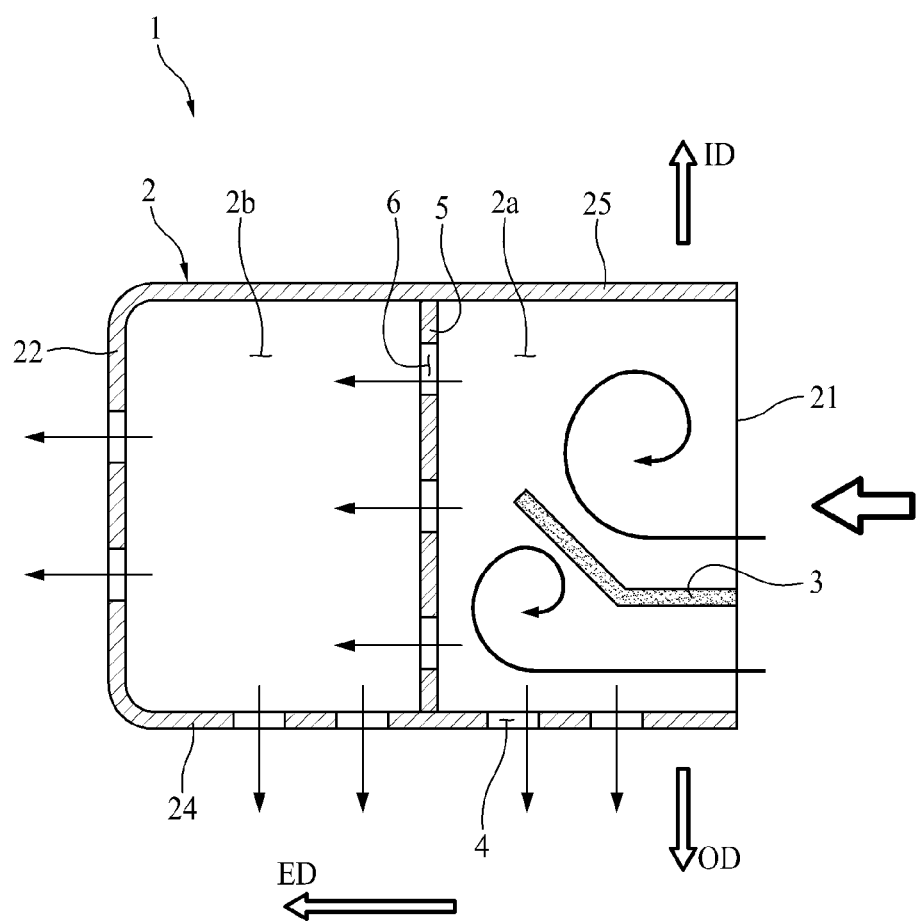
【Figure 12】

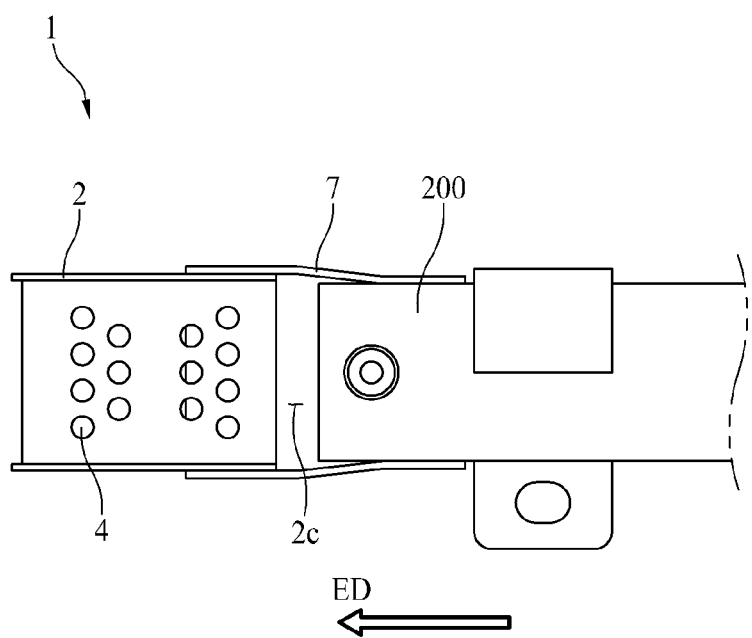
[Figure 13]

[Figure 14]
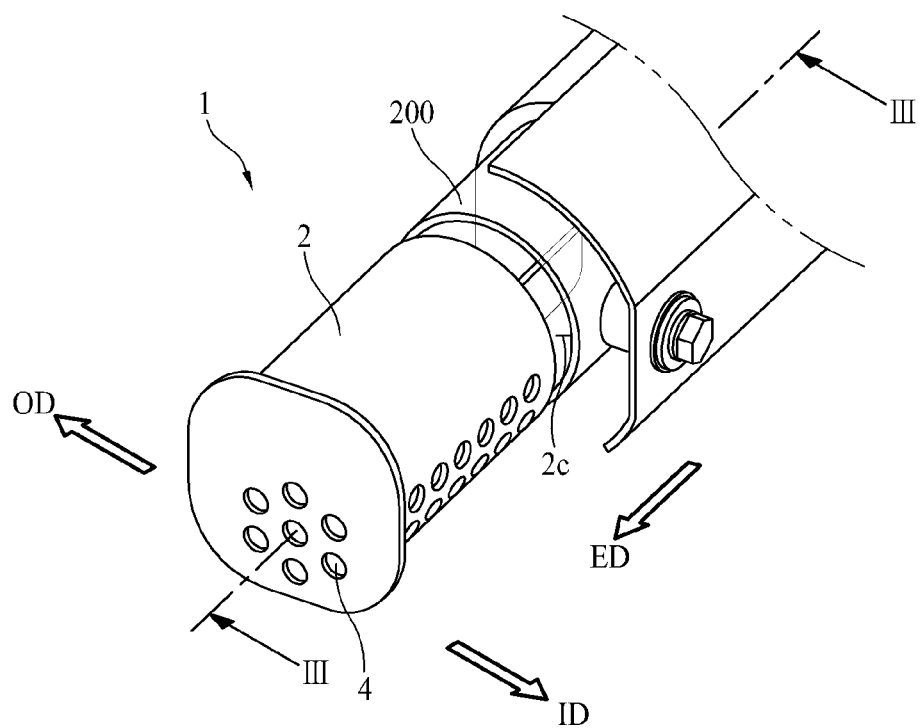

[Figure 15]
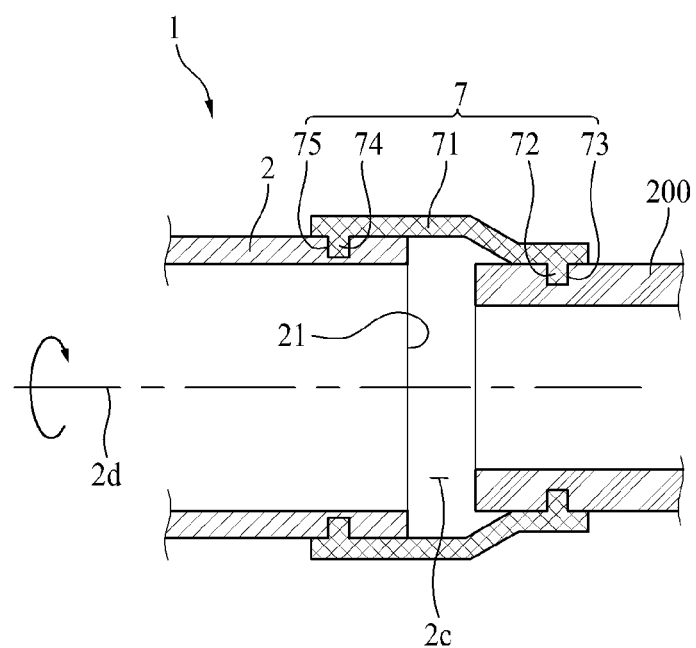

[Figure 16]
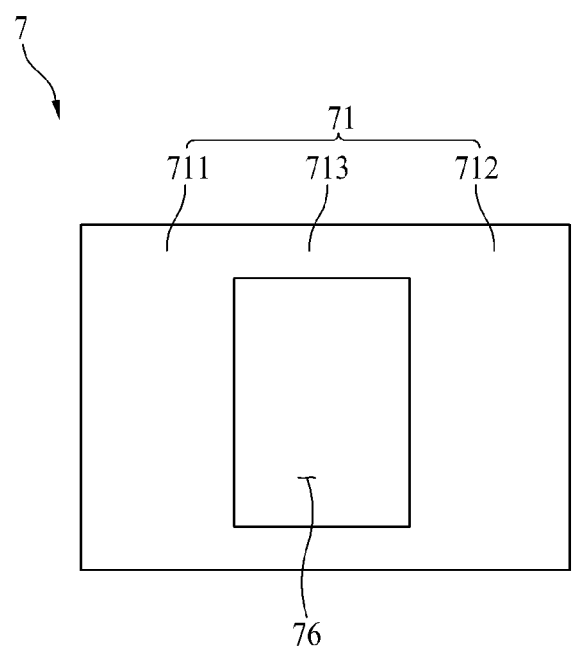

EXHAUST GAS DISPERSION DEVICE FOR AGRICULTURAL WORKING VEHICLE

CROSS-REFERENCE TO RELATED APPLICATIONS

The present application is a National Stage of International Application No. PCT/KR2017/002299 filed Mar. 3, 2017, which claims priority to Korean Application No. 10-2016-0033053, filed Mar. 18, 2016 the disclosures of which are incorporated herein by reference.

TECHNICAL FIELD

The present invention relates to an exhaust gas dispersion device for an agricultural working vehicle configured to disperse exhaust gas discharged from the agricultural working vehicle.

BACKGROUND ART

Agricultural working vehicles are used to cultivate crops, which are necessary for human life, using soil. For example, combines, tractors, or the like belong to the agricultural working vehicles. The combine performs the work of reaping and threshing crops such as rice, barley, wheat, beans, or the like. The tractor performs the work necessary for cultivating crops using a traction force.

The agricultural working vehicle includes a discharge port configured to discharge exhaust gas generated in an operation process of an engine to the outside.

FIG. 1 is a schematic side view illustrating a discharge port configured to discharge exhaust gas in an agricultural working vehicle according to the related art.

Referring to FIG. 1, in an agricultural working vehicle 100 according to the related art, a discharge port 110 configured to discharge exhaust gas is installed to be positioned on a lower side of a side surface of a vehicle body 120. The discharge port 110 is obliquely installed on the lower side of the side surface of the vehicle body 120 to face a ground G. Accordingly, exhaust gas generated in an operation process of an engine (not shown) is discharged from the discharge port 110 approximately toward the ground G.

Here, since the exhaust gas is generated in the operation process of the engine and is in a high temperature state, the exhaust gas is discharged to the ground G through the discharge port 110 at a high speed. Accordingly, the agricultural working vehicle 100 according to the related art has problems causing various kinds of damages such as an occurrence of dust due to the exhaust gas discharged toward the ground G, damage to agricultural products positioned on the ground G, and damage to structures such as vinyl houses or the like installed on the ground G.

DISCLOSURE

Technical Problem

Therefore, the present invention is designed to solve the problems and is for providing an exhaust gas dispersion device for an agricultural working vehicle capable of reducing damages caused by exhaust gas.

Technical Solution

To solve the above problems, the present invention may include the following configurations.

An exhaust gas dispersion device for an agricultural working vehicle according to the present invention includes: a dispersing body into which exhaust gas discharged from a discharge port of the agricultural working vehicle is introduced; a deceleration part coupled to the dispersing body to reduce a speed of the exhaust gas introduced into the dispersing body; and a plurality of dispersing holes formed to pass through the dispersing body at positions spaced apart from each other so that exhaust gas decelerated by the deceleration part is dispersed and discharged to an outside of the dispersing body.

Advantageous Effects

The present invention can provide the following effects.

The present invention is implemented such that exhaust gas is discharged to the outside after a speed of the exhaust gas is reduced, thereby reducing various kinds of damages such as an occurrence of dust, damage to agricultural products, and damage to structures such as vinyl houses, or the like, which are caused by exhaust gas being discharged at a high speed.

The present invention is implemented such that exhaust gas discharged from a discharge port is dispersed and discharged to the outside, thereby reducing various kinds of damages caused by the large amount of exhaust gas being concentrated in a specific area and discharged.

DESCRIPTION OF DRAWINGS

FIG. 1 is a schematic side view illustrating a discharge port configured to discharge exhaust gas in an agricultural working vehicle according to the related art.

FIG. 2 is a schematic perspective view illustrating a state in which an exhaust gas dispersion device for an agricultural working vehicle according to the present invention is coupled to a discharge port.

FIG. 3 is a schematic plan cross-sectional view taken along line I-I of FIG. 2 for illustrating the exhaust gas dispersion device for an agricultural working vehicle according to the present invention.

FIGS. 4 and 5 are schematic perspective views of a dispersing body in the exhaust gas dispersion device for an agricultural working vehicle according to the present invention.

FIG. 6 is a schematic bottom view of the dispersing body in the exhaust gas dispersion device for an agricultural working vehicle according to the present invention.

FIG. 7 is a schematic perspective view illustrating a state in which the exhaust gas dispersion device for an agricultural working vehicle according to the present invention is installed in the agricultural working vehicle.

FIGS. 8 and 9 are schematic plan cross-sectional views taken along line I-I of FIG. 2 for illustrating a deceleration part of the exhaust gas dispersion device for an agricultural working vehicle according to the present invention.

FIG. 10 is a schematic perspective view of a partitioning part in the exhaust gas dispersion device for an agricultural working vehicle according to the present invention.

FIG. 11 is a schematic side cross-sectional view taken along line II-II of FIG. 4 for illustrating the exhaust gas dispersion device for an agricultural working vehicle according to the present invention.

FIG. 12 is a schematic plan cross-sectional view taken along line I-I of FIG. 2 for illustrating an exemplary embodiment having the partitioning part in the exhaust gas dispersion device for an agricultural working vehicle according to the present invention.

FIG. 13 is a schematic side view illustrating a state in which the exhaust gas dispersion device for an agricultural working vehicle according to the present invention is coupled to the discharge port.

FIG. 14 is a schematic perspective view illustrating a state in which a dispersing body according to a modified embodiment is coupled to a discharge port, in the exhaust gas dispersion device for an agricultural working vehicle according to the present invention.

FIG. 15 is a schematic side cross-sectional view taken along line III-III of FIG. 14 for illustrating a state in which the dispersing body according to the modified embodiment is coupled to the discharge port in the exhaust gas dispersion device for an agricultural working vehicle according to the present invention.

FIG. 16 is a schematic side view of a supporting part in the exhaust gas dispersion device for an agricultural working vehicle according to the present invention.

BEST MODE

Hereinafter, embodiments of an exhaust gas dispersion device for an agricultural working vehicle according to the present invention will be described in detail with reference to the accompanying drawings.

Referring to FIGS. 2 and 3, an exhaust gas dispersion device 1 for an agricultural working vehicle according to the present invention is installed in an agricultural working vehicle (not shown) such as tractors, combines, or the like. The exhaust gas dispersion device 1 for an agricultural working vehicle according to the present invention disperses exhaust gas discharged from a discharge port 200 of the agricultural working vehicle and discharges the dispersed exhaust gas to the outside.

To this end, the exhaust gas dispersion device 1 for an agricultural working vehicle according to the present invention includes a dispersing body 2 into which the exhaust gas discharged from the discharge port 200 is introduced, a deceleration part 3 coupled to the dispersing body 2, and a plurality of dispersing holes 4 formed in the dispersing body 2 to be spaced apart from each other. The deceleration part 3 is provided to reduce a speed of the exhaust gas introduced into the dispersing body 2. The dispersing holes 4 are provided to disperse the exhaust gas decelerated by the deceleration part 3 and discharge the dispersed exhaust gas to the outside of the dispersing body 2. Accordingly, the exhaust gas discharged from the discharge port 200 is decelerated by the deceleration part 3 while flowing into the dispersing body 2, dispersed through the dispersing holes 4, and discharged to the outside of the dispersing body 2.

Accordingly, the exhaust gas dispersion device 1 for an agricultural working vehicle according to the present invention may provide operating effects as described below.

First, the exhaust gas dispersion device 1 for an agricultural working vehicle according to the present invention is implemented to reduce a speed of the exhaust gas, which is discharged from the discharge port 200 and introduced into the dispersing body 2, using the deceleration part 3. Accordingly, the exhaust gas dispersion device 1 for an agricultural working vehicle according to the present invention may reduce various kinds of damages such as an occurrence of dust, damage to agricultural products, and damage to structures such as vinyl houses, or the like, which are caused by the exhaust gas being discharged at a high speed, by reducing the speed of the exhaust gas discharged to the outside of the dispersing body 2.

Second, the exhaust gas dispersion device 1 for an agricultural working vehicle according to the present invention is implemented to disperse the exhaust gas using the dispersing holes 4 and to discharge the dispersed exhaust gas to the outside of the dispersing body 2. Accordingly, the exhaust gas dispersion device 1 for an agricultural working vehicle according to the present invention may further reduce various kinds of damages such as an occurrence of dust, damage to agricultural products, and damage to structures such as vinyl houses, or the like, which are caused by the large amount of exhaust gas being concentrated in a specific area and discharged, by reducing a flow rate of the exhaust gas discharged to the outside of the dispersing body 2 through each of the dispersing holes 4.

Hereinafter, the dispersing body 2, the deceleration part 3, and the dispersing holes 4 will be described in detail with reference to the accompanying drawings.

Referring to FIGS. 2 to 7, the exhaust gas discharged from the discharge port 200 is introduced into the dispersing body 2. The exhaust gas discharged from the discharge port 200 may be generated in an operation process of an engine (not shown) provided in the agricultural working vehicle. For example, the engine may be a diesel engine or a gasoline engine. The exhaust gas may be discharged in a discharge direction from the discharge port 200. The exhaust gas discharged from the discharge port 200 flows in an inflow direction (arrow ED direction) and is introduced into the dispersing body 2. The dispersing body 2 may be installed to be positioned in the inflow direction (the arrow ED direction) with respect to the discharge port 200. The inflow direction (the arrow ED direction) and the discharge direction may be the same direction as each other.

The dispersing body 2 may be formed in a rectangular parallelepiped shape having a hollow inside, but the present invention is not limited thereto, and the dispersing body 2 may be formed in other shapes such as a cylindrical shape as long as the exhaust gas discharged from the discharge port 200 can be introduced thereinto.

The dispersing body 2 may include an inflow path 21.

The inflow path 21 is a path through which the exhaust gas discharged from the discharge port 200 flows into the dispersing body 2. The inflow path 21 may be implemented by being formed to pass through the dispersing body 2. Accordingly, a portion of the dispersing body 2, in which the inflow path 21 is positioned, may be formed to be opened. The dispersing body 2 may be installed such that the inflow path 21 faces toward the discharge port 200.

The dispersing body 2 may include an opposite sidewall 22 and a lower sidewall 23.

The opposite sidewall 22 is provided to block the flow of the exhaust gas discharged from the discharge port 200. The opposite sidewall 22 may be disposed to face the discharge port 200. In this case, the opposite sidewall 22 may be disposed to be positioned in the inflow direction (the arrow ED direction) with respect to the discharge port 200. Accordingly, the dispersing body 2 may use the opposite sidewall 22 to prevent the exhaust gas discharged from the discharge port 200 from being injected directly toward the inflow direction (the arrow ED direction). Accordingly, the exhaust gas dispersion device 1 for an agricultural working vehicle according to the present invention may reduce various kinds of damages caused by the exhaust gas in an area positioned in the inflow direction (the arrow ED direction) with respect to the dispersing body 2.

The entire opposite sidewall 22 may be formed in a rectangular plate shape, but the present invention is not limited thereto, and the entire opposite sidewall 22 may be formed in other shapes such as a disc shape or the like as long as the flow of the exhaust gas discharged from the discharge port 200 is blocked.

The lower sidewall 23 is provided to block the flow of the exhaust gas discharged from the discharge port 200. The lower sidewall 23 may be coupled to a lower side of the opposite sidewall 22. In this case, the lower sidewall 23 may be disposed to be positioned in a lower side direction with respect to an inside of the dispersing body 2. The lower sidewall 23 may form a lower portion of the dispersing body 2. Accordingly, the dispersing body 2 may use the lower sidewall 23 to prevent the exhaust gas discharged from the discharge port 200 from being injected directly toward the lower side direction. Accordingly, the exhaust gas dispersion device 1 for an agricultural working vehicle according to the present invention may reduce various kinds of damages caused by the exhaust gas in an area positioned in the lower side direction with respect to the dispersing body 2.

The entire lower sidewall 23 may be formed in a rectangular plate shape, but the present invention is not limited thereto, and the entire lower sidewall 23 may be formed in other shapes such as a disc shape or the like as long as the flow of the exhaust gas discharged from the discharge port 200 is blocked. The lower sidewall 23 and the opposite sidewall 22 may be separately manufactured and coupled to each other through a process such as bolting, welding, or the like. The lower sidewall 23 and the opposite sidewall 22 may be integrally formed.

The dispersing body 2 may include a first dispersing sidewall 24.

The first dispersing sidewall 24 is provided to block the flow of the exhaust gas discharged from the discharge port 200. The first dispersing sidewall 24 may be coupled to the lower sidewall 23 to be positioned at one side of the opposite sidewall 22. The dispersing body 2 may be installed such that the first dispersing sidewall 24 faces the outside (arrow OD direction) of a vehicle body 300 (shown in FIG. 7) of the agricultural working vehicle. Accordingly, the dispersing body 2 may use the first dispersing sidewall 24 to prevent the exhaust gas discharged from the discharge port 200 from being injected directly toward the outside (the arrow OD direction) of the vehicle body 300. Accordingly, the exhaust gas dispersion device 1 for an agricultural working vehicle according to the present invention may reduce various kinds of damages caused by the exhaust gas in an area positioned on the outside (the arrow OD direction) of the vehicle body 300 with respect to the dispersing body 2.

The entire first dispersing sidewall 24 may be formed in a rectangular plate shape, but the present invention is not limited thereto, and the entire first dispersing sidewall 24 may be formed in other shapes such as a disc shape or the like as long as the flow of the exhaust gas discharged from the discharge port 200 is blocked. The first dispersing sidewall 24, the lower sidewall 23, and the opposite sidewall 22 may be separately manufactured and coupled to each other through the process such as bolting, welding, or the like. Also, the first dispersing sidewall 24, the lower sidewall 23, and the opposite sidewall 22 may be integrally formed. The first dispersing sidewall 24 and the lower sidewall 23, which are integrally formed, and the opposite sidewall 22, which is separately manufactured, are coupled to each other through the process such as bolting, welding, or the like.

The dispersing body 2 may include a second dispersing sidewall 25.

The second dispersing sidewall 25 is provided to block the flow of the exhaust gas discharged from the discharge port 200. The second dispersing sidewall 25 may be coupled to the lower sidewall 23 to be positioned at the other side of the opposite sidewall 22. The second dispersing sidewall 25 and the first dispersing sidewall 24 may be disposed to face each other. The dispersing body 2 may be installed such that the second dispersing sidewall 25 faces an inside (arrow ID direction) of the vehicle body 300 of the agricultural working vehicle. Accordingly, the dispersing body 2 may use the second dispersing sidewall 25 to prevent the exhaust gas discharged from the discharge port 200 from being injected directly toward the inside (the arrow ID direction) of the vehicle body 300. Accordingly, the exhaust gas dispersion device 1 for an agricultural working vehicle according to the present invention may reduce various kinds of damages caused by the exhaust gas in an area positioned in the vehicle body 300 (the arrow ID direction) with respect to the dispersing body 2.

The entire second dispersing sidewall 25 may be formed in a rectangular plate shape, but the present invention is not limited thereto, and may be formed in other shapes such as a disc shape or the like as long as the flow of the exhaust gas discharged from the discharge port 200 is blocked. The second dispersing sidewall 25, the first dispersing sidewall 24, the lower sidewall 23, and the opposite sidewall 22 may be separately manufactured and coupled to each other through the process such as bolting, welding, or the like. Also, the second dispersing sidewall 25, the first dispersing sidewall 24, the lower sidewall 23, and the opposite sidewall 22 may be integrally formed. The second dispersing sidewall 25, the first dispersing sidewall 24, and the lower sidewall 23 may be integrally formed and coupled to the opposite sidewall 22, which is separately manufactured, through the process such as bolting, welding, or the like.

The dispersing body 2 may include an upper sidewall 26.

The upper sidewall 26 is provided to block the flow of the exhaust gas discharged from the discharge port 200. The upper sidewall 26 may be coupled to an upper side of the opposite sidewall 22. In this case, the upper sidewall 26 may be disposed to be positioned in an upper side direction with respect to the inside of the dispersing body 2. The upper sidewall 26 may form an upper portion of the dispersing body 2. Accordingly, the dispersing body 2 may use the upper sidewall 26 to prevent the exhaust gas discharged from the discharge port 200 from being injected directly toward the upper side direction. Accordingly, the exhaust gas dispersion device 1 for an agricultural working vehicle according to the present invention may prevent the exhaust gas from being injected to the vehicle body 300 or toward a worker positioned in the upper side direction with respect to the dispersing body 2. The upper sidewall 26 and the lower sidewall 23 may be disposed to face each other.

The entire upper sidewall 26 may be formed in a rectangular plate shape, but the present invention is not limited thereto, and the entire upper sidewall 26 may be formed in other shapes such as a disc shape or the like as long as the flow of the exhaust gas discharged from the discharge port 200 is blocked. The upper sidewall 26, the second dispersing sidewall 25, the first dispersing sidewall 24, the lower sidewall 23, and the opposite sidewall 22 may be separately manufactured and coupled to each other through the process such as bolting, welding, or the like. Also, the upper sidewall 26, the second dispersing sidewall 25, the first dispersing sidewall 24, the lower sidewall 23, and the opposite sidewall 22 may be integrally formed. The upper sidewall 26, the second dispersing sidewall 25, the first dispersing sidewall 24, and the lower sidewall 23 may be integrally formed, and coupled to the opposite sidewall 22, which is separately manufactured, through the process such as bolting, welding, or the like.

Referring to FIGS. 2 to 8, the deceleration part 3 is provided to reduce the speed of the exhaust gas introduced into the dispersing body 2. The deceleration part 3 is installed in the dispersing body 2. The deceleration part 3 may be coupled to the dispersing body 2 to be positioned in the dispersing body 2, thereby being installed in the dispersing body 2. The speed of the exhaust gas, which is discharged from the discharge port 200 and introduced into the dispersing body 2, is reduced while passing through the deceleration part 3. Accordingly, the exhaust gas dispersion device 1 for an agricultural working vehicle according to the present invention may reduce the speed of the exhaust gas discharged to the outside of the dispersing body 2 by decreasing the speed of the exhaust gas introduced into the dispersing body 2 using the deceleration part 3. Accordingly, the exhaust gas dispersion device 1 for an agricultural working vehicle according to the present invention may reduce various kinds of damages caused by the exhaust gas being discharged at a high speed.

The deceleration part 3 may include a first deceleration member 31 and a second deceleration member 32.

The first deceleration member 31 is installed in the dispersing body 2. The first deceleration member 31 may be coupled to the dispersing body 2 to be positioned in the dispersing body 2, thereby being installed in the dispersing body 2. The exhaust gas introduced into the dispersing body 2 flows along the first deceleration member 31 and flows toward the second deceleration member 32. The entire first deceleration member 31 may be formed in a rectangular plate shape, but the present invention is not limited thereto, and the entire first deceleration member 31 may be formed in other shapes as long as the flow of the exhaust gas is guided.

The first deceleration member 31 is coupled to the dispersing body 2 so that the inflow path 21 is partitioned into a first path 21a (shown in FIG. 8) and a second path 21b (shown in FIG. 8). Accordingly, the first deceleration member 31 allows the exhaust gas discharged from the discharge port 200 to be dispersed into the first path 21a and the second path 21b and introduced into the dispersing body 2. The first deceleration member 31 may be coupled to each of the lower sidewall 23 and the upper sidewall 26, thereby partitioning the inflow path 21 into the first path 21a and the second path 21b.

The first deceleration member 31 may partition such that the first path 21a has a greater area than the second path 21b. In this case, the first deceleration member 31 may be disposed to be positioned at a position such that a distance spaced from the first dispersing sidewall 24 is smaller than a distance spaced from the second dispersing sidewall 25. Accordingly, the first path 21a is implemented to have a width W1 (shown in FIG. 8) greater than a width W2 (shown in FIG. 8) of the second path 21b with respect to a direction perpendicular to the inflow direction (the arrow ED direction), so that the first path 21a may be implemented to have a greater area than the second path 21b.

The second deceleration member 32 is installed in the dispersing body 2. The second deceleration member 32 may be coupled to the dispersing body 2 to be positioned in the dispersing body 2, thereby being installed in the dispersing body 2. The entire second deceleration member 32 may be formed in a rectangular plate shape, but the present invention is not limited thereto, and the entire second deceleration member 32 and may be formed in other shapes as long as the flow of the exhaust gas is guided.

The second deceleration member 32 and the first deceleration member 31 may be disposed to face each other in different directions. Accordingly, the second deceleration member 32 and the first deceleration member 31 may change a flow direction of the exhaust gas introduced into the dispersing body 2, thereby inducing the exhaust gas introduced into the dispersing body 2 to form a swirl. The speed of the exhaust gas introduced into the dispersing body 2 is reduced while forming the swirl. Accordingly, the second deceleration member 32 and the first deceleration member 31 reduce the speed of the exhaust gas introduced into the dispersing body 2, thereby reducing various kinds of damages caused by the exhaust gas being discharged at a high speed.

The second deceleration member 32 may be coupled to the first deceleration member 31. In this case, the second deceleration member 32 may be coupled to the first deceleration member 31 to be positioned at a position closer to the opposite sidewall 22 than the first deceleration member 31. The second deceleration member 32 may be coupled to the first deceleration member 31 to be coupled to each of the lower sidewall 23 and the upper sidewall 26. The second deceleration member 32 and the first deceleration member 31 may be integrally formed.

The second deceleration member 32 may be disposed to be inclined with respect to the inflow direction (the arrow ED direction). In this case, the first deceleration member 31 may be disposed in parallel with respect to the inflow direction (the arrow ED direction). Accordingly, the first deceleration member 31 may function to partition the inflow path 21 into the first path 21a and the second path 21b and disperse the flow rate of the exhaust gas introduced into the dispersing body 2. The second deceleration member 32 may function to change a flow direction of the exhaust gas passing through the first deceleration member 31 and induce the exhaust gas passing through the first deceleration member 31 to form the swirl.

An included angle 3a (shown in FIG. 8) between the second deceleration member 32 and the first deceleration member 31 may be obtuse. Accordingly, the second deceleration member 32 and the first deceleration member 31 may be implemented so that the exhaust gas introduced into the dispersing body 2 flows smoothly and forms the swirl. This will be described in detail as follows.

First, when the included angle 3a between the second deceleration member 32 and the first deceleration member 31 is right or acute, the flow direction of the exhaust gas introduced into the dispersing body 2 is suddenly changed by second deceleration member 32. Accordingly, when the included angle 3a between the second deceleration member 32 and the first deceleration member 31 is right angle or acute, the exhaust gas introduced into the dispersing body 2 has difficulty forming the swirl and the exhaust gas is subjected to a high resistance force against being discharged from the discharge port 200 in the process of changing the flow direction by the second deceleration member 32, thereby reducing a discharging power of the exhaust gas.

Next, when the included angle 3a between the second deceleration member 32 and the first deceleration member 31 is obtuse, the flow direction of the exhaust gas introduced into the dispersing body 2 is gradually changed along the second deceleration member 32 in the process of flowing in the inflow direction (arrow ED direction). Accordingly, when the included angle 3a between the second deceleration member 32 and the first deceleration member 31 is obtuse, the flow direction of the exhaust gas introduced into the dispersing body 2 is gradually changed along the second deceleration member 32 to form the swirl, and resistance to the exhaust gas being discharged from the discharge port 200 in the process of changing the flow direction by the second deceleration member 32 may be reduced Accordingly, the exhaust gas dispersion device 1 for an agricultural working vehicle according to the present invention may induce the exhaust gas introduced into the dispersing body 2 to form the swirl while being smoothly introduced by implementing the included angle 3a between the second deceleration member 32 and first deceleration member 31 to be obtuse. Accordingly, the exhaust gas dispersion device 1 for an agricultural working vehicle according to the present invention may reduce the speed of the exhaust gas introduced into the dispersing body 2 while allowing the exhaust gas to be smoothly discharged from the discharge port 200.

The second deceleration member 32 may be disposed to be inclined in a direction from the second path 21b to the first path 21a. In this case, the first deceleration member 31 may partition the inflow path 21 such that the first path 21a has a greater area than the second path 21b. Accordingly, the exhaust gas introduced into the dispersing body 2 through the first path 21a flows along the second deceleration member 32 and changes the flow direction thereof, thereby forming the swirl and reducing the speed of the exhaust gas. The exhaust gas introduced into the dispersing body 2 through the second path 21b passes through the first deceleration member 31 and increases a flow area thereof, thereby forming the swirl and reducing the speed of the exhaust gas. Since a space 3b (shown in FIG. 8) which is positioned in the inflow direction (the arrow ED direction) passing through the second deceleration member 32 is formed with a lower air pressure than the other spaces, the exhaust gas introduced into the dispersing body 2 through the second path 21b passes through the first deceleration member 31 and then forms the swirl, thereby reducing the speed of the exhaust gas.

Meanwhile, FIG. 8 shows that each of the first and second deceleration members 31 and 32 is formed to have a plane surface, but the present invention is not limited thereto, and each of the second deceleration member 32 and the first deceleration member 31 may be formed to have a curved surface. In this case, any one of the first deceleration member 31 and the second deceleration member 32 may be formed to have a plane surface, and the other one may be formed to have a curved surface. When each of the first deceleration member 31 and the second deceleration member 32 is formed to have a curved surface, the first deceleration member 31 and the second deceleration member 32 may be integrally formed to have the same curvature. The first deceleration member 31 and the second deceleration member 32 may be separately formed to have different curvatures from each other. When the first deceleration member 31 and the second deceleration member 32 are formed to have different curvatures from each other, the second deceleration member 32 may be formed to have a greater curvature than the first deceleration member 31.

Referring to FIG. 9, in the deceleration part 3 according to the modified embodiment of the present invention, the first deceleration member 31 and the second deceleration member 32 may be implemented as described below.

The first deceleration member 31 may be coupled to the first dispersing sidewall 24 to be positioned in the dispersing body 2. In this case, one side of the first deceleration member 31 may be coupled to the first dispersing sidewall 24. The first deceleration member 31 may be disposed such that the other side thereof protrudes toward the second dispersing sidewall 25. The first deceleration member 31 may be coupled to be inclined to the first dispersing sidewall 24 such that the other side of the first deceleration member 31 is closer to the opposite sidewall 22 than the one side thereof coupled to the first dispersing sidewall 24. Accordingly, the first deceleration member 31 may reduce the speed of the exhaust gas by changing the flow direction of the exhaust gas introduced into the dispersing body 2 through the inflow path 21. Upper and lower sides of the first deceleration member 31 may be respectively coupled to the upper and lower sidewalls 26 and 23.

The first deceleration member 31 may be disposed to be inclined in the inflow direction (the arrow ED direction). In this case, an included angle 31a between the first deceleration member 31 and the first dispersing sidewall 24 may be obtuse. The included angle 31a is positioned in a direction toward the inflow path 21. Accordingly, the deceleration part 3 according to the modified embodiment of the present invention may be implemented such that the exhaust gas introduced into the dispersing body 2 smoothly flows and the flow direction is changed by the first deceleration member 31.

The second deceleration member 32 may be coupled to the second dispersing sidewall 25 to be positioned in the dispersing body 2. In this case, one side of the second deceleration member 32 may be coupled to the second dispersing sidewall 25. The second deceleration member 32 may be disposed such that the other side thereof protrudes toward the first dispersing sidewall 24. The second deceleration member 32 may be coupled to be inclined to the second dispersing sidewall 25 such that the other side of the second deceleration member 32 is closer to the opposite sidewall 22 than the one side thereof coupled to the second dispersing sidewall 25. Accordingly, the second deceleration member 32 may reduce the speed of the exhaust gas by changing the flow direction of the exhaust gas introduced into the dispersing body 2 through the inflow path 21. Upper and lower sides of the second deceleration member 31 may be respectively coupled to the upper and lower sidewalls 26 and 23.

The second deceleration member 32 and the first deceleration member 31 may change the flow direction of the exhaust gas in different directions. For example, the first deceleration member 31 may change the flow direction of the exhaust gas to the inside of the vehicle body 300 (the arrow ID direction). In this case, the second deceleration member 32 may change the flow direction of the exhaust gas to the outside of the vehicle body 300 (the arrow OD direction). Accordingly, the deceleration part 3 according to the modified embodiment of the present invention is implemented such that the flow direction of the exhaust gas is changed while flowing along the first deceleration member 31 and the flow direction of the exhaust gas is changed again while flowing along the second deceleration member 32, thereby decelerating the exhaust gas at a slower speed. Accordingly, the deceleration part 3 according to the modified embodiment of the present invention has an advantage in that various kinds of damages caused by the exhaust gas being discharged at a high speed may be further reduced.

Meanwhile, a lower air pressure may be formed in a space 31*b* (shown in FIG. 9) positioned in the inflow direction (the arrow ED direction) passing through the first deceleration member 31 and a space 32*b* (shown in FIG. 9) positioned in the inflow direction (the arrow ED direction) passing through the second deceleration member 32 than in the other spaces. Accordingly, the exhaust gas introduced into the dispersing body 2 forms the swirl after passing through each of the first deceleration member 31 and the second deceleration member 32, thereby reducing the speed of the exhaust gas. Accordingly, the deceleration part 3 according to the modified embodiment of the present invention has an advantage in that various kinds of damages caused by the exhaust gas being discharged at a high speed may be further reduced.

The second deceleration member 32 may be disposed to be inclined in the inflow direction (the arrow ED direction). In this case, an included angle 32a between the second deceleration member 32 and the second dispersing sidewall 25 may be obtuse. The included angle 32a is positioned in a direction toward the inflow path 21. Accordingly, the deceleration part 3 according to the modified embodiment of the present invention may be implemented such that the exhaust gas introduced into the dispersing body 2 smoothly flows, and the flow direction thereof is changed by the second deceleration member 32.

The second deceleration member 32 may be positioned at a position closer to the opposite sidewall 22 than the first deceleration member 31. In this case, the first and second deceleration members 31 and 32 may be disposed so that parts thereof overlap each other. Accordingly, the deceleration part 3 according to the modified embodiment of the present invention reduces the flow rate of the exhaust gas flowing directly to the second deceleration member 32 without passing through the first deceleration member 31, and simultaneously increases the flow rate of the exhaust gas flowing to the second deceleration member 32 after passing through the first deceleration member 31. Accordingly, the deceleration part 3 according to the modified embodiment of the present invention may be implemented to further reduce various kinds of damages, which are caused by the exhaust gas being discharged at a high speed, by decelerating the exhaust gas at a slower rate.

For example, the second deceleration member 32 and the first deceleration member 31 may be disposed such that the other side of the second deceleration member 32 is positioned at a portion closer to the opposite sidewall 22 than the other side of the first deceleration member 31. Accordingly, the exhaust gas introduced into the dispersing body 2 may change the flow direction thereof while flowing along the first deceleration member 31, and change again the flow direction thereof while flowing along the second deceleration member 32. The second deceleration member 32 and the first deceleration member 31 may be disposed such that the other side of the second deceleration member 32 overlaps the other side of the first deceleration member 31.

FIG. 9 shows that the deceleration part 3 according to the modified embodiment of the present invention includes one first deceleration member 31 and one second deceleration member 32, but the present invention is not limited thereto, and the deceleration part 3 according to the modified embodiment of the present invention may include two or more of each of the first deceleration member 31 and the second deceleration member 32. In this case, the first deceleration member 31 and the second deceleration member 32 may be alternately disposed in the inflow direction (the arrow ED direction).

Meanwhile, FIG. 9 shows that each of the first and second deceleration members 31 and 32 is formed to have a plane surface, but the present invention is not limited thereto, and each of the second deceleration member 32 and the first deceleration member 31 may be formed to have a curved surface. In this case, any one of the first deceleration member 31 and the second deceleration member 32 may be formed to have a plane surface, and the other one thereof may be formed to have a curved surface.

Referring to FIGS. 2 to 6, the dispersing holes 4 are provided to disperse the exhaust gas and discharge the dispersed exhaust gas to the outside of the dispersing body 2. The dispersing holes 4 are formed to pass through the dispersing body 2. A plurality of dispersing holes 4 may be formed in the dispersing body 2. In this case, the dispersing holes 4 may be formed to pass through the dispersing body 2 at positions spaced apart from each other. Accordingly, the exhaust gas decelerated by the deceleration part 3 may be dispersed into each of the dispersing holes 4 and discharged to the outside of the dispersing body 2. Accordingly, the exhaust gas dispersion device 1 for an agricultural working vehicle according to the present invention may reduce various kinds of damages caused by the large amount of exhaust gas being concentrated in a specific area and discharged by reducing the flow rate of the exhaust gas discharged to the outside of the dispersing body 2 through each of the dispersing holes 4.

Each of the dispersing holes 4 may be formed in a disc shape, but the present invention is not limited thereto, and each of the dispersing holes 4 may be formed in other shapes such as a rectangular plate shape as long as the exhaust gas introduced into the dispersing body 2 is dispersed and discharged to the outside of the dispersing body 2.

Referring to FIG. 4, the dispersing holes 4 may be formed to pass through each of the opposite sidewall 22 and the first dispersing sidewall 24. In this case, a greater number of dispersing holes 4 may be formed in the first dispersing sidewall 24 than in the opposite sidewall 22. Accordingly, the exhaust gas dispersion device 1 for an agricultural working vehicle according to the present invention may reduce the flow rate of the exhaust gas discharged to the outside of the dispersing body 2 through the dispersing holes 4 formed in the opposite sidewall 22 in comparison with the flow rate of the exhaust gas discharged to the outside of the dispersing body 2 through the dispersing holes 4 formed in the first dispersing sidewall 24. Accordingly, the exhaust gas dispersion device 1 for an agricultural working vehicle according to the present invention may further reduce various kinds of damages caused by the exhaust gas in an area positioned on the opposite sidewall 22.

Meanwhile, the first dispersing sidewall 24 may be formed to have a greater area than the opposite sidewall 22. Accordingly, even when a greater number of dispersing holes 4 are formed in the first dispersing sidewall 24 than in the opposite sidewall 22, the exhaust gas may be dispersed over a wider area through the dispersing holes 4 formed in the first dispersing sidewall 24 and discharged to the outside of the dispersing body 2. Accordingly, the exhaust gas dispersion device 1 for an agricultural working vehicle according to the present invention may further reduce various kinds of damages caused by the exhaust gas in an area positioned on the first dispersing sidewall 24.

Referring to FIGS. 4 and 6, the dispersing holes 4 may be formed to pass through each of the first dispersing sidewall 24 and the lower sidewall 23. In this case, a greater number of dispersing holes 4 may be formed in the first dispersing sidewall 24 than in the lower sidewall 24. Accordingly, the exhaust gas dispersion device 1 for an agricultural working vehicle according to the present invention may reduce the flow rate of the exhaust gas discharged to the outside of the dispersing body 2 through the dispersing holes 4 formed in the lower sidewall 23 in comparison with the flow rate of the exhaust gas discharged to the outside of the dispersing body 2 through the dispersing holes 4 formed in the first dispersing sidewall 24. Accordingly, the exhaust gas dispersion device 1 for an agricultural working vehicle according to the present invention may reduce various kinds of damages caused by the exhaust gas in an area positioned on the lower sidewall 24.

Meanwhile, the area positioned on the lower sidewall 23 side may correspond to the ground positioned on a lower side of the agricultural working vehicle. Alternatively, the area positioned on the first dispersing sidewall 24 side may correspond to an area positioned outside the agricultural working vehicle. Accordingly, the exhaust gas discharged through the dispersing holes 4 formed in the first dispersing sidewall 24 moves a greater distance than the exhaust gas discharged through the dispersing holes 4 formed in the lower sidewall 23 to reach agricultural products, devices, or the like, which are positioned on a periphery of the agricultural working vehicle. This is because a space between the lower sidewall 23 and the ground is smaller than a space between the first dispersing sidewall 24 and the agricultural products, devices, or the like. Accordingly, even when a greater number of the dispersing holes 4 are formed in the first dispersing sidewall 24 than the lower sidewall 23, the exhaust gas may be discharged over a wider space through the dispersing holes 4 formed in the first dispersing sidewall 24. Accordingly, the exhaust gas dispersion device 1 for an agricultural working vehicle according to the present invention may reduce various damages caused by the exhaust gas in the area positioned on the lower sidewall 23 as well as various damages caused by the exhaust gas in the area positioned on the first dispersing sidewall 24, by forming a greater number of dispersing holes 4 in the first dispersing sidewall 24 than in the lower sidewall 23. Although not shown in the drawings, the dispersing holes 4 may not be formed in the lower sidewall 23.

Referring to FIGS. 4, 5 and 7, when the first dispersing sidewall 24 is disposed to face the outside (the arrow OD direction) of the vehicle body 300 and the second dispersing sidewall 25 is disposed to face the inside (the arrow ID direction) of the vehicle body 300, the dispersing holes 4 may be formed only in the first dispersing sidewall 24 between the first and second dispersing sidewalls 24 and 25. That is, the dispersing body 2 may be implemented such that the dispersing holes 4 are not formed in the second dispersing sidewall 24. Accordingly, the exhaust gas dispersion device 1 for an agricultural working vehicle according to the present invention may reduce various kinds of damages caused by the exhaust gas in an area positioned in the vehicle body 300 by preventing the exhaust gas from being discharged toward the inside (the arrow ID direction) of the vehicle body 300. Further, the exhaust gas dispersion device 1 for an agricultural working vehicle according to the present invention may prevent the exhaust gas from being discharged to the vehicle body 300, particularly, to the engine (not shown) installed in the agricultural working vehicle.

Referring to FIG. 4, the dispersing body 2 may be implemented such that the dispersing holes 4 are not formed in the upper sidewall 26. Accordingly, the exhaust gas dispersion device 1 for an agricultural working vehicle according to the present invention may prevent the exhaust gas from being discharged to the vehicle body 300, particularly, to the engine installed in the agricultural working vehicle, by preventing the exhaust gas from being discharged in the upper side direction of the dispersing body 2. Further, the exhaust gas dispersion device 1 for an agricultural working vehicle according to the present invention may prevent the exhaust gas from being injected toward the worker.

Referring to FIGS. 10 to 12, the exhaust gas dispersion device 1 for an agricultural working vehicle according to the present invention may include a partitioning part 5 and a through hole 6.

The partitioning part 5 is provided to partition the inside of the dispersing body 2. The partitioning part 5 may be coupled to the dispersing body 2 to be positioned in the dispersing body 2. The partitioning part 5 is coupled to the dispersing body 2 to be positioned between the opposite sidewall 22 and the inflow path 21, thereby partitioning the inside of the dispersing body 2.

The partitioning part 5 may be coupled to at least one of the upper sidewall 26, the lower sidewall 23, the first dispersing sidewall 24, and the second dispersing sidewall 25 so that the inside of the dispersing body 2 is partitioned into a first dispersing space 2a and a second dispersing space 2b. The first dispersing space 2a is positioned on the inflow path 21 side. The second dispersing space 2b is positioned on the opposite sidewall 22.

The through hole 6 is provided to disperse the exhaust gas. The through hole 6 is formed to pass through the partitioning part 5. A plurality of through holes 6 may be formed in the partitioning part 5. In this case, the through holes 6 may be formed to pass through the partitioning part 5 at positions spaced apart from each other. Accordingly, a part of the exhaust gas introduced into the first dispersing space 2a may flow into the second dispersing space 2b through the through holes 6. Accordingly, the exhaust gas dispersion device 1 for an agricultural working vehicle according to the present invention is implemented to disperse the exhaust gas introduced into the dispersing body 2 into each of the first dispersing space 2a and the second dispersing space 2b and discharge the exhaust gas to the outside of the dispersing body 2, thereby further reducing various kinds of damages caused by the large amount of exhaust gas being concentrated in a specific area and discharged.

Each of the through holes 6 may be formed in a disc shape, but the present invention is not limited thereto, and each of the through holes 6 may be formed in other shapes such as a rectangular plate shape as long as each of the through holes 6 passes a part of the exhaust gas introduced into the first dispersing space 2a to the second dispersing space 2b.

The partitioning part 5 may reduce an ejection rate of the exhaust gas by partitioning the inside of the dispersing body 2. Since the ejection of the exhaust gas occurs most strongly in the inflow direction (the arrow ED direction), the ejection rate of the exhaust gas in the inflow direction (the arrow ED direction) may be remarkably reduced by partitioning the inside of the dispersing body 2 into two spaces in the inflow direction (the arrow ED direction) by the partitioning part 5.

Here, the deceleration part 3 may be coupled to the dispersing body 2 to be positioned in the first dispersing space 2a. In this case, a part of the exhaust gas decelerated by the deceleration part 3 may be discharged from the first dispersing space 2a to the outside of the dispersing body 2, and a part of the exhaust gas decelerated by the deceleration part 3 may flow into the second dispersing space 2b through the through holes 6 and may be discharged to the outside of the dispersing body 2.

The dispersing holes 4 connected to the first dispersing space 2a and the dispersing holes 4 connected to the second dispersing space 2b may be formed in the first dispersing sidewall 24. Accordingly, each of the exhaust gas positioned in the first dispersing space 2a and the exhaust gas positioned in the second dispersing space 2b may be discharged to the outside of the dispersing body 2 through the dispersing holes 4 formed in the first dispersing sidewall 24. The dispersing holes 4 connected to the first dispersing space 2a and the dispersing holes 4 connected to the second dispersing space 2b may be formed in the first dispersing sidewall 24 so as to have the same number. The dispersing holes 4 connected to the first dispersing space 2a and the dispersing holes 4 connected to the second dispersing space 2b may be formed in the first dispersing sidewall 24 so as to have different numbers.

Referring to FIGS. 4 and 10 to 12, the through holes 6 formed in the partitioning part 5 and the dispersing holes 4 formed in the opposite sidewall 22 may be mispositioned at positions relative to each other.

For example, the dispersing holes 4 may not be formed in an upper side region 22a of the opposite sidewall 22 as shown in FIG. 4, and the through hole 6 may not be formed in a lower side region 5a of the partitioning part 5 as shown in FIG. 10. In this case, the dispersing holes 4 may be formed to pass through a lower side region of the opposite sidewall 22, and the through holes 6 may be formed to pass through an upper side region of the partitioning part 5 Accordingly, the through holes 6 formed in the partitioning part 5 and the dispersing holes 4 formed in the opposite sidewall 22 may be disposed at misaligned positions relative to each other. The dispersing holes 4 may be formed to pass through the lower side region of the opposite sidewall 22 and a middle region of the opposite sidewall 22. The upper side region 22a, the middle region, and the lower side region of the opposite sidewall 22 are virtual regions obtained by partitioning the opposite sidewall 22 into three regions with respect to upward and downward directions. The upper side region 22a of the opposite sidewall 22 may be positioned on an upper side with respect to the middle region of the opposite sidewall 22 and the lower side region of the opposite sidewall 22 may be positioned on a lower side with respect to the middle region of the opposite sidewall 22. The middle region of the opposite sidewall 22 may be positioned between the upper side region 22a of the opposite sidewall 22 and the lower side region of the opposite sidewall 22. The through holes 6 may be formed to pass through the upper side region of the partitioning part 5 and a middle region of the partitioning part 5. The upper side region, the middle region, and the lower side region 5a of the partitioning part 5 are virtual regions obtained by partitioning the partitioning part 5 into three regions with respect to the upward and downward directions. The upper side region of the partitioning part 5 may be positioned on an upper side with respect to the middle region of the partitioning part 5 and the lower side region 5a of the partitioning part 5 may be positioned on a lower side with respect to the middle region of the partitioning part 5. The middle region of the partitioning part 5 may be positioned between the upper side region of the partitioning part 5 and the lower side region 5a of the partitioning part 5.

For example, as shown in FIG. 11, the dispersing holes 4 formed in the opposite sidewall 22 and the through holes 6 formed in the partitioning part 5 may be mispositioned at positions relative to each other relative to each other with respect to the upward and downward directions.

For example, as shown in FIG. 12, the dispersing holes 4 formed in the opposite sidewall 22 and the through holes 6 formed in the partitioning part 5 may be disposed to be positioned at misaligned positions relative to each other with respect to leftward and rightward directions.

As described above, the through holes 6 formed in the partitioning part 5 and the dispersing holes 4 formed in the opposite sidewall 22 are disposed to be positioned at misaligned positions relative to each other, so that the exhaust gas dispersion device 1 for an agricultural working vehicle according to the present invention may further increase a deceleration effect on the exhaust gas. This will be described in detail as follows.

First, when the through holes 6 formed in the partitioning part 5 and the dispersing holes 4 formed in the opposite sidewall 22 are disposed to be positioned at substantially the same positions without being misaligned from each other, an amount of exhaust gas discharged to the outside of the dispersing body 2 through the dispersing holes 4 without being blocked by the opposite sidewall 22 in the exhaust gas passing through the through holes 6 and flowing into the second dispersing space 2b may be relatively high. Accordingly, the effect of decelerating the exhaust gas using the opposite sidewall 22 may be reduced.

Next, when the through holes 6 formed in the partitioning part 5 and the dispersing holes 4 formed in the opposite sidewall 22 are disposed to be positioned at misaligned positions relative to each other, an amount of exhaust gas discharged to the outside of the dispersing body 2 through the dispersing holes 4 after being blocked by the opposite sidewall 22 in the exhaust gas passing through the through holes 6 and flowing into the second dispersing space 2b may be relatively high. Also, when the through holes 6 formed in the partitioning part 5 and the dispersing holes 4 formed in the opposite sidewall 22 are disposed to be positioned at misaligned positions relative to each other, an amount of exhaust gas discharged to the outside of the dispersing body 2 through the dispersing holes 4 without being blocked by the opposite sidewall 22 in the exhaust gas passing through the through holes 6 and flowing into the second dispersing space 2b may be relatively small. Accordingly, the effect of decelerating the exhaust gas using the opposite sidewall 22 may be increased. Accordingly, in the exhaust gas dispersion device 1 for an agricultural working vehicle according to the present invention, by disposing the through holes 6 formed in the partitioning part 5 and the dispersing holes 4 formed in the opposite sidewall 22 to be positioned at misaligned positions relative to each other, the deceleration effect on the exhaust gas may be increased, thereby further reducing the various kinds of damages caused by the exhaust gas.

Referring to FIGS. 7 and 13 to 15, the exhaust gas dispersion device 1 for an agricultural working vehicle according to the present invention may include a supporting part 7.

The supporting part 7 is provided to support the dispersing body 2. The supporting part 7 may support the dispersing body 2 such that the dispersing body 2 is positioned in the inflow direction (the arrow ED direction) with respect to the discharge port 200. The supporting part 7 may support the dispersing body 2 such that the inflow path 21 (shown in FIG. 15) is positioned at a position spaced apart from the discharge port 200. Accordingly, an open path 2c is positioned between the dispersing body 2 and the discharge port 200. Accordingly, the exhaust gas dispersion device 1 for an agricultural working vehicle according to the present invention may prevent the discharging power of the exhaust gas discharged from the discharge port 200 from being decreased due to a generation of stagnation when the exhaust gas is decelerated by the deceleration part 3 positioned in the dispersing body 2. This is because a part of the exhaust gas discharged from the discharge port 200 is discharged to the outside through the open path 2c.

The supporting part 7 may be coupled to the discharge port 200 to support the dispersing body 2. The supporting part 7 may also be coupled to the vehicle body 300 to support the dispersing body 2. In this case, the supporting part 7 may be coupled to a frame 310 (shown in FIG. 7) provided in the vehicle body 300 to support the dispersing body 2. The supporting part 7 may be coupled to the discharge port 200 or the vehicle body 300 through a coupling process such as bolting, welding, inserting and fitting, or the like.

Although not shown in the drawings, the dispersing body 2 may be directly coupled to the vehicle body 300. In this case, the dispersing body 2 may be directly coupled to the vehicle body 300 through the coupling process such as bolting, welding, inserting and fitting, or the like. The dispersing body 2 may be directly coupled to the frame 310 provided in the vehicle body 300.

The supporting part 7 may be rotatably coupled to the discharge port 200. Accordingly, the supporting part 7 may rotate about a rotation axis 2d (shown in FIG. 15) to change a direction in which the dispersing holes 4 formed in the dispersing body 2 are directed. Accordingly, the exhaust gas dispersion device 1 for an agricultural working vehicle according to the present invention may further reduce various kinds of damages caused by the exhaust gas by adjusting the direction in which the dispersing holes 4 are directed according to a working environment on which the agricultural working vehicle is positioned. Also, the exhaust gas dispersion device 1 for an agricultural working vehicle according to the present invention is implemented to reduce various kinds of damages caused by the exhaust gas in various working environments, thereby improving versatility applicable to the agricultural working vehicle used in various working environments.

When the supporting part 7 is rotatably coupled to the discharge port 200, the lower sidewall 23, the first dispersing sidewall 24, the second dispersing sidewall 25, and the upper sidewall 26 may be formed in a cylindrical shape in the dispersing body 2. In this case, the lower sidewall 23, the first dispersing sidewall 24, the second dispersing sidewall 25, and the upper sidewall 26 may be integrally formed.

Referring to FIG. 15, the supporting part 7 may include a coupling member 71 coupled to the discharge port 200 and the dispersing body 2, and a first coupling protrusion 72 formed to protrude from the coupling member 71. In this case, a first insertion groove 73 into which the first coupling protrusion 72 is inserted may be formed in the discharge port 200. The supporting part 7 may be rotatably coupled to the discharge port 200 by inserting the first coupling protrusion 72 into the first insertion groove 73. The first insertion groove 73 may be formed to be recessed at a predetermined depth in a circumferential direction of the discharge port 200. The first coupling protrusion 72 may be formed in a shape corresponding to the first insertion groove 73.

The supporting part 7 may include a second coupling protrusion 74 formed to protrude from the coupling member 71. In this case, a second insertion groove 75 into which the second coupling protrusion 74 is inserted may be formed in the dispersing body 2. The dispersing body 2 may be rotatably coupled to the supporting part 7 by inserting the second coupling protrusion 74 into the second insertion groove 75. The second insertion groove 75 may be formed to be recessed at a predetermined depth in a circumferential direction of the dispersing body 2. The second coupling protrusion 74 may be formed in a shape corresponding to the second insertion groove 75.

The supporting part 7 may include both the first coupling protrusion 72 and the second coupling protrusion 74. In this case, the first insertion groove 73 may be formed in the discharge port 200, and the second insertion groove 75 may be formed in the dispersing body 2. The supporting part 7 may include only the first coupling protrusion 72. In this case, the supporting part 7 may be coupled to the dispersing body 2 through the coupling process such as bolting, welding, or the like. The supporting part 7 may include only the second coupling protrusion 74. In this case, the supporting part 7 may be coupled to the discharge port 200 through the coupling process such as bolting, welding, or the like.

Referring to FIGS. 14 to 16, the supporting part 7 may include a communication hole 76. The communication hole 76 may be formed to pass through the coupling member 71. The supporting part 7 may be coupled to the discharge port 200 and the dispersing body 2 such that the communication hole 76 is connected to the open path 2c. Accordingly, even when the exhaust gas dispersion device 1 for an agricultural working vehicle according to the present invention is implemented to adjust the direction in which the dispersing holes 4 are directed, the discharging power of the exhaust gas discharged from the discharge port 200 may be prevented from being lowered due to the generation of stagnation when the exhaust gas is decelerated by the deceleration part 3 positioned in the dispersing body 2 using the open path 2c and the communication hole 76. This is because a part of the exhaust gas discharged from the discharge port 200 is discharged to the outside through the open path 2c and the communication hole 76.

Here, the coupling member 71 may include a first coupling member 711 coupled to the dispersing body 2, a second coupling member 712 coupled to the discharge port 200, and a connecting member 713 configured to connect the first coupling member 711 to the second coupling member 712. The connecting member 713 may be coupled to each of the first coupling member 711 and the second coupling member 712 so as to be positioned between the first coupling member 711 and the second coupling member 712. The communication hole 76 may be connected to the open path 2c by being formed to pass through the connecting member 713. In this case, the remaining portion of the connecting member 713 except a portion on which the communication hole 76 is formed may be coupled to each of the first coupling member 711 and the second coupling member 712. A plurality of communication holes 76 may be formed in the connecting member 713. The communication holes 76 may be formed to pass through the connecting member 713 in the inside (the arrow ID direction) of the vehicle body 300 and the outside (the arrow OD direction) of the vehicle body 300. Each of the first coupling member 711, the second coupling member 712, and the connecting member 713 may be formed in a cylindrical shape.

While the exemplary embodiments of the present invention and their advantages have been described in detail with reference to the accompanying drawings, it will be apparent to those skilled in the art to which the present invention belongs that various changes, substitutions and alterations may be made herein without departing from the scope of the present invention.

The invention claimed is:

1. An exhaust gas dispersion device for an agricultural working vehicle, comprising:

a dispersing body into which exhaust gas discharged from a discharge port of the agricultural working vehicle is introduced;

a deceleration part coupled to the dispersing body to reduce a speed of the exhaust gas introduced into the dispersing body; and a plurality of dispersing holes formed to pass through the dispersing body at positions spaced apart from each other so that the exhaust gas decelerated by the deceleration part is dispersed and discharged to an outside of the dispersing body, wherein the deceleration part includes a first deceleration member installed in the dispersing body and a second deceleration member installed in the dispersing body, wherein the first deceleration member and the second deceleration member are disposed to face different directions from each other so that a flow direction of the exhaust gas introduced into the dispersing body is changed to form a swirl, wherein the dispersing body includes an inflow path through which the exhaust gas discharged from the discharge port is introduced, wherein the first deceleration member partitions the inflow path into a first path and a second path, wherein the second deceleration member is coupled to the first deceleration member so as to be disposed to be inclined in a direction from the second path toward the first path, and wherein an included angle between the first deceleration member and the second deceleration member has an obtuse angle.

2. The exhaust gas dispersion device of claim 1, wherein the first deceleration member is disposed in parallel with respect to an inflow direction in which the exhaust gas is introduced into the dispersing body, and wherein the second deceleration member is disposed to be inclined with respect to the inflow direction.

3. The exhaust gas dispersion device of claim 1, wherein the first deceleration member partitions the inflow path so that the first path has a greater area than the second path.

4. The exhaust gas dispersion device of claim 1, comprising a supporting part configured to support the dispersing body, wherein the supporting part supports the dispersing body so that the inflow path is positioned so as to be spaced apart from the discharge port and an open path is positioned between the dispersing body and the discharge port.

5. The exhaust gas dispersion device of claim 1, wherein the dispersing body includes:

an opposite sidewall disposed to face the discharge port;

a lower sidewall coupled to a lower side of the opposite sidewall, an upper sidewall coupled to an upper side of the opposite sidewall, a first dispersing sidewall coupled to the lower sidewall to be positioned on one side of the opposite sidewall, and a second dispersing sidewall coupled to the lower sidewall to be positioned on the other side of the opposite sidewall.

6. The exhaust gas dispersion device of claim 5, wherein the dispersing body is disposed such that the first dispersing sidewall faces an outside of a vehicle body of the agricultural working vehicle and the second dispersing sidewall faces an inside of the vehicle body, wherein the dispersing holes are formed in the first dispersing sidewall, and wherein the dispersing holes are not formed in the second dispersing sidewall.

7. The exhaust gas dispersion device of claim 5, wherein the dispersing holes are formed in the opposite sidewall.

8. The exhaust gas dispersion device of claim 5, comprising a partitioning part installed in the dispersing body, and a plurality of through holes formed to pass through the partitioning part at positions spaced apart from each other, wherein the partitioning part is coupled to the dispersing body so as to be positioned between the opposite sidewall and the inflow path, and partitions the inside of the dispersing body into a first dispersing space positioned on a side of the inflow path and a second dispersing space positioned on a side of the opposite sidewall.

9. The exhaust gas dispersion device of claim 7, comprising a partitioning part installed in the dispersing body, and a plurality of through holes formed to pass through the partitioning part at positions spaced apart from each other, wherein the dispersing holes are not formed in an upper side region of the opposite sidewall, and wherein the through holes are not formed in a lower side region of the partitioning part.

10. The exhaust gas dispersion device of claim 7, comprising a partitioning part coupled to the dispersing body to be positioned in the dispersing body, and a plurality of through holes formed to pass through the partitioning part at positions spaced apart from each other, wherein the through holes and the dispersing holes formed in the opposite sidewall are disposed to be positioned at misaligned positions relative to each other.

11. The exhaust gas dispersion device of claim 6, wherein the dispersing holes are formed in the opposite sidewall.

12. The exhaust gas dispersion device of claim 11, comprising a partitioning part coupled to the dispersing body to be positioned in the dispersing body, and a plurality of through holes formed to pass through the partitioning part at positions spaced apart from each other, wherein the through holes and the dispersing holes formed in the opposite sidewall are disposed to be positioned at misaligned positions relative to each other.

13. An exhaust gas dispersion device for an agricultural working vehicle, comprising:

a dispersing body into which exhaust gas discharged from a discharge port of the agricultural working vehicle is introduced;

a deceleration part coupled to the dispersing body to reduce a speed of the exhaust gas introduced into the dispersing body; and a plurality of dispersing holes formed to pass through the dispersing body at positions spaced apart from each other so that the exhaust gas decelerated by the deceleration part is dispersed and discharged to an outside of the dispersing body, wherein the dispersing body includes:

an opposite sidewall disposed to face the discharge port;
a lower sidewall coupled to a lower side of the opposite sidewall,
an upper sidewall coupled to an upper side of the opposite sidewall,
a first dispersing sidewall coupled to the lower sidewall to be positioned on one side of the opposite sidewall, and
a second dispersing sidewall coupled to the lower sidewall to be positioned on the other side of the opposite sidewall,
wherein the dispersing holes are formed in the opposite sidewall.

14. The exhaust gas dispersion device of claim 13, wherein the deceleration part includes a first deceleration member coupled to the first dispersing sidewall so as to be positioned in the dispersing body and a second deceleration member coupled to the second dispersing sidewall so as to be positioned in the dispersing body,
wherein each of the first deceleration member and the second deceleration member is disposed to be inclined in an inflow direction,
wherein an included angle between the first deceleration member and the first dispersing sidewall has an obtuse angle, and
wherein an included angle between the second deceleration member and the second dispersing sidewall has an obtuse angle.

15. The exhaust gas dispersion device of claim 14, wherein the second deceleration member is positioned at a position closer to the opposite sidewall than the first deceleration member.

16. The exhaust gas dispersion device of claim 14, wherein a part of the second deceleration member and a part of the first deceleration member are disposed to overlap each other.

* * * * *